United States Patent [19]
Underhill et al.

[11] Patent Number: 6,094,900
[45] Date of Patent: Aug. 1, 2000

[54] TENSION CONTROL SYSTEM FOR ROUND BALE FORMING APPARATUS

[75] Inventors: Kenneth R. Underhill, Strasburg; Dennis L. White, Lancaster, both of Pa.

[73] Assignee: New Holland North America, Inc., New Holland, Pa.

[21] Appl. No.: 09/302,545

[22] Filed: Apr. 30, 1999

Related U.S. Application Data

[60] Provisional application No. 60/084,867, May 8, 1998.

[51] Int. Cl.$^7$ ................................................. A01D 39/00
[52] U.S. Cl. ............................................. 56/341; 100/88
[58] Field of Search ................................ 56/341; 100/88

[56] References Cited

U.S. PATENT DOCUMENTS

| | | | |
|---|---|---|---|
| 4,257,219 | 3/1981 | Burrough et al. | 56/341 |
| 4,391,187 | 7/1983 | Koning et al. | 100/88 |
| 4,566,379 | 1/1986 | Decoene et al. | 100/89 |
| 4,698,955 | 10/1987 | Wagstaff | 56/341 |
| 4,759,279 | 7/1988 | Frerich | 100/89 |
| 4,763,464 | 8/1988 | Mouret | 56/341 |
| 4,870,812 | 10/1989 | Jennings et al. | 56/341 |
| 5,014,613 | 5/1991 | Merritt, III et al. | 100/5 |
| 5,025,718 | 6/1991 | Viaud et al. | 100/88 |
| 5,134,839 | 8/1992 | Clostermeyer et al. | 56/341 |
| 5,177,944 | 1/1993 | Finlay | 56/365 |
| 5,327,821 | 7/1994 | McClure et al. | 100/5 |
| 5,367,865 | 11/1994 | Jennings et al. | 56/341 |
| 5,444,969 | 8/1995 | Wagstaff et al. | 56/341 |
| 5,519,990 | 5/1996 | Rodewald et al. | 56/341 |
| 5,622,104 | 4/1997 | Viesselmann et al. | 100/88 |
| 5,839,362 | 11/1998 | Ratzlaff et al. | 100/88 |

OTHER PUBLICATIONS

Brochure entitled: "BZ Zweeger ROBALL® 1512 Presse A Bales Ronde"—p. 3 of Specification No Date.

*Primary Examiner*—Thomas B. Will
*Assistant Examiner*—Meredith C. Petravick
*Attorney, Agent, or Firm*—Frank A. Seemar; Larry W. Miller; J. William Stader

[57] ABSTRACT

A round baler is disclosed for forming crop material into cylindrical bales. The baler has a main frame, a pair of side walls, a crop pickup mounted on the main frame, and a tailgate pivotally connected to the main frame. The tailgate is operative between a closed position during which a bale is being formed in an expandable chamber, and an open position during which a formed bale is being discharged from the chamber. A sledge assembly, pivotally mounted on the main frame for movement between a bale starting position and a full bale position, has crop engaging transverse rolls for urging the crop material along a spiral path in the chamber for starting and forming a bale. An apron is supported along a continuous path on the main frame and tailgate by a plurality of rotatable guide members. The path has an inner course that cooperates with the sledge rolls on the sledge assembly to define the chamber. A take up assembly, affixed to the sledge assembly, moves therewith between the bale starting position and full bale position. Structural twisting during uneven loading of the bale chamber is countered by a hydraulic cylinder affixed between the main frame and the sledge assembly.

6 Claims, 6 Drawing Sheets

TENSION CONTROL SYSTEM FOR ROUND BALE FORMING APPARATUS

CROSS REFERENCE TO RELATED APPLICATION

This application claims the benefit of U.S. Provisional Application No. 60/084,867, filed May 8, 1998, and entitled "Round Bale Forming Apparatus".

FIELD OF THE INVENTION

The present invention relates to agricultural apparatus for forming and wrapping cylindrical packages of crop material, generally referred to as round balers, and more particularly to a tension control system for a round baler in which a package of crop material is formed in an expandable, generally cylindrically shaped forming chamber.

BACKGROUND OF THE INVENTION

Round balers generally have a bale forming chamber defined by a pair of opposing side walls associated with an array of side-by-side belts, transverse slats trained on chains, a plurality of transverse rolls or a combination of these various elements, e.g., rolls and belts. During field operation, windrowed crop material such as hay is picked up from the ground and fed in a continuous stream into a fixed or variable diameter chamber. The hay is rolled into a cylindrical package within the chamber, wrapped with twine, net or the like and ejected onto the ground for subsequent handling.

U.S. Pat. No. 5,444,969, issued Aug. 29, 1995 in the name of Robert A. Wagstaff, et al, discloses a prior art round baler of the general nature described above. In this particular type of baler an expandable chamber is defined by a pair of sidewalls, and a plurality of side-by-side belts cooperating with a series of transverse rolls, mounted between a pair of pivotally mounted arms. The chamber includes an inlet opening in the front through which crop material is fed. The aforementioned arrangement of rolls and arms is commonly referred to as a sledge assembly. Also shown in the disclosed baler is a pair of take up arms pivotally mounted on the main frame, between which arms a pair of guide rolls are journalled. The outer surfaces of the guide rolls are urged against the belts to maintain belt tension and thereby prevent slack from occurring in the belts during expansion and contraction of the chamber. General arrangements of this nature are commonly referred to as apron tensioning systems.

Examples of prior art tensioning systems used in round balers of the general type shown in the '969 patent, are disclosed in U.S. Pat. No. 5,014,613, issued May 14, 1991 in the name of John H. Merritt, et al, U.S. Pat. No. 5,327,821, issued Jul. 12, 1994 in the name of John R. McClure, et al, and U.S. Pat. No. 5,367,865, issued Nov. 29, 1994 in the name of Richard E. Jennings, et al. In U.S. Pat. No. 5,014,613 the apron tensioning system shown employs a spring and pivot arm combination, while in U.S. Pat. No. 5,327,821 a system is shown that utilizes an hydraulic cylinder in combination with a pivot arm assembly. The tensioning mechanism in the U.S. Pat. No. 5,014,613 discloses a prior art system in which both a spring and an hydraulic cylinder are used.

In the three aforementioned apron tensioning systems, the elements are all mounted outwardly of the sidewalls of the balers. In another prior art baler an apron tensioning cylinder is centrally mounted on the front of the frame, e.g., see French brochure No. F-8602BP, printed in Holland in 1986 by the PZ Zweegers Company. This brochure is entitled "PZ Zweegers ROBALL(R) 1512 PRESSE A BALLES Rondes". It should be noted that the baler shown in this brochure is a belt type baler, i.e., the expandable chamber is defined only by belts, as opposed to rolls and belts.

The present invention relates to apron tensioning for a round baler in which a cylindrical package of crop material is formed between expandable walls consisting of a combination of belts and rolls of the general nature described in the '969 patent, cited above. This patent is an example of many prior art patents, assigned to New Holland North America, Inc., that disclose this type of round baler, referred to by some as a roll belt round baler. Unique structural characteristics, described below, contribute to a round baler having an apron tensioning system that, among other things, enhances performance, simplifies construction and improves durability. Additionally, there is a noted improvement in the appearance and density of round bales formed by the baler of the present invention.

SUMMARY OF THE INVENTION

An important object of the present invention is to provide an expandable chamber round baler with an improved apron tensioning system for preventing structural twisting during expansion of the chamber.

Another important object of the present invention is to provide an expandable chamber round baler with an improved apron tensioning system having hydraulic means interposed between the center of a movable roll mounting assembly and the baler main frame.

Yet another important object of the present invention is to provide a roll/belt round baler with an improved apron tensioning system having hydraulic means interposed between the center of a movable roll mounting assembly and the baler main frame to improve belt tracking.

Still another important object of the present invention is to provide an expandable chamber round baler with an improved apron tensioning system that maintains bale shape during expansion of the chamber.

A further important object of the present invention is to provide an expandable chamber round baler with an adjustable tensioning system for varying the density of bales formed in the chamber.

Yet a further important object of the present invention is to provide an expandable chamber round baler with an adjustable tensioning system for forming bales with increased density.

In pursuance of these and other important objects the present invention contemplates an improved round baler for forming crop material into cylindrical bales, wherein the baler comprises a main frame, and a tailgate pivotally connected to the main frame. The tailgate is operative between a closed position during which a bale is being formed, and an open position during which a formed bale is being discharged. The baler further comprises a sledge assembly mounted on the main frame for movement between a bale starting position and a full bale position, the sledge assembly including conveying means having a crop engaging surface extending transversely of the main frame. An apron is supported along a continuous path on the main frame and on the tailgate by a plurality of rotatable guide members, the apron path having an inner course that cooperates with the conveying means on the sledge assembly to define a bale forming chamber. The baler still further comprises a forwardly mounted pickup for feeding crop material into the chamber. More particularly, the improvement contemplates a hydraulic cylinder, means for mounting the hydraulic cylinder in a general fore and aft direction between the main frame and the sledge assembly for providing a compressive load on the sledge assembly, and means for coupling the hydraulic cylinder to the sledge assembly.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
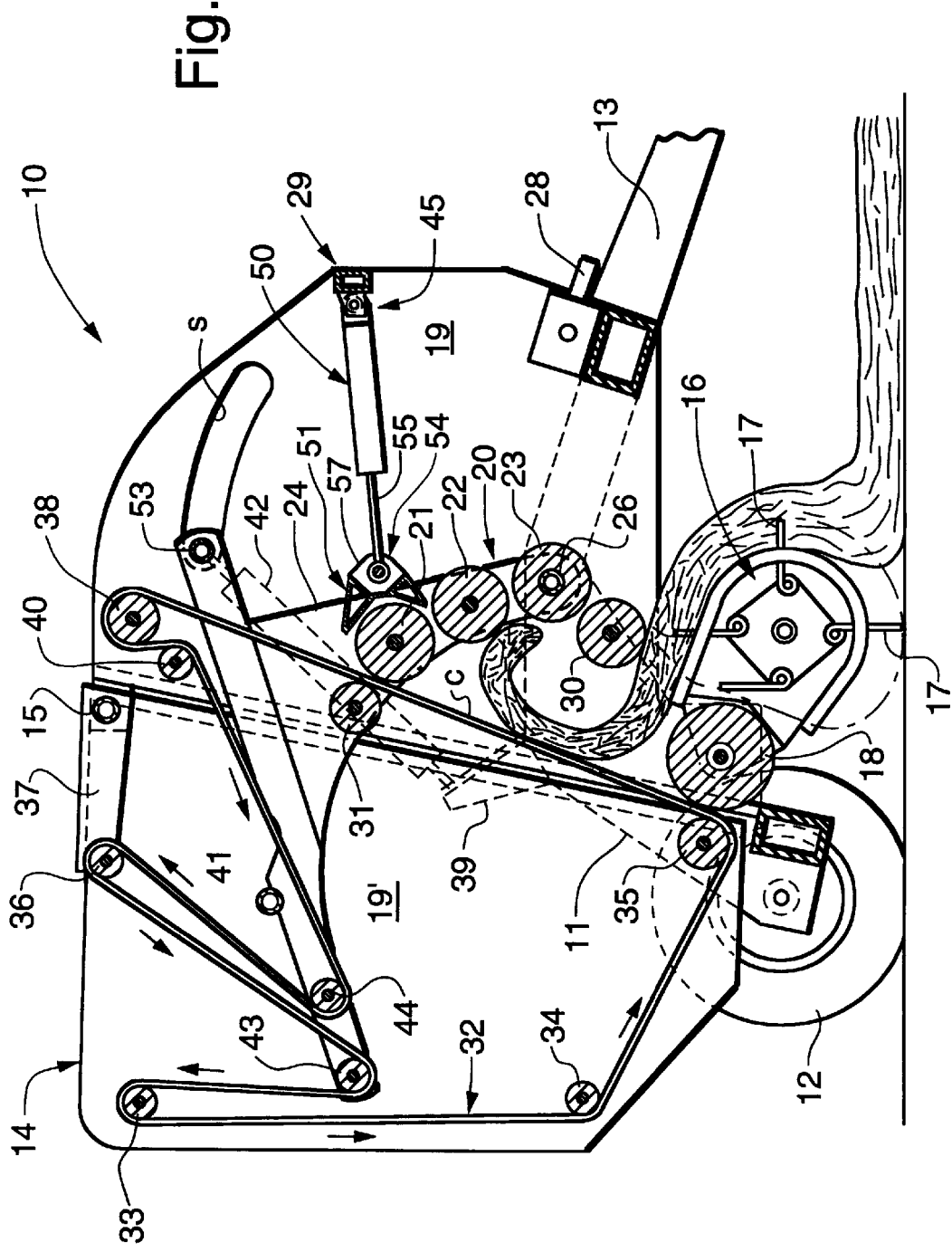
FIG. 1 is a diagrammatic side elevational view of a round baler in which the present invention is incorporated. The tailgate is in the closed position and the elements of the bale forming chamber are shown in their core starting condition.

Referring to the drawings for a detailed description of the preferred embodiment of the invention, FIG. 1 shows the cross section of a round baler 10 of the type in which the present invention is readily embodied. Baler 10 has an expandable chamber defined in part by belts and rolls. This type of expandable chamber is disclosed in various prior art patents, e.g., U.S. Pat. No. 5,444,969 mentioned above, and earlier U.S. Pat. No. 4,870,812, issued Oct. 12, 1989 in the name of Richard E. Jennings, et al, both of which are hereby incorporated by reference. It should be noted that throughout this description the drawings are diagrammatic in nature to best show the elements of the baler in which the invention is embodied. To this end, in many instances only one element in a pair is shown, especially in those cases where identical elements exist, disposed on opposing sides of the baler, e.g., wheels.

Baler 10 has a main frame 11, comprising a plurality of rigid structural elements including a pair of side walls 19 (only one shown). Main frame 11 is supported by a pair of wheels 12 (also only one shown). A forwardly mounted tongue 13, integral with main frame 11, provides for connection to a tractor. Pivotally connected to side walls 19 by a pair of stub shafts 15 (only one shown) is a tailgate 14 which is closed during bale formation. Tailgate 14 includes walls 19' coplanar with side walls 19. A pickup 16, mounted on main frame 11, has a plurality of tines 17, the tips of which are movable along a predetermined path to lift crop material from the ground and deliver it rearwardly along a generally horizontal path toward a floor roll 18, rotatably mounted on main frame 11.

An expandable chamber for forming bales is defined by side walls 19, 19', belts and a sledge assembly 20, operative between the inwardly facing surfaces of such walls. Sledge assembly 20 comprises a plurality of transversely extending rolls 21, 22, 23 journalled at their ends in a pair of spaced apart arms 24, one of which is shown. These arms are pivotally mounted on stub shafts 26 for providing movement of sledge assembly 20 from the bale starting position shown in FIG. 1 through the partly full position shown in FIG. 2 to the full bale position shown in FIG. 3, and finally to the bale discharge position shown in FIG. 4. Rolls 21, 22, 23 are driven in a counter-clockwise direction by conventional means (for example, chains and sprockets) coupled via an appropriate drive train to a drive shaft 28. A starter roll 30, located adjacent roll 23, is also driven counter-clockwise. Sledge assembly 20 includes a forth roll, a freely rotatable idler roll 31, also carried between arms 24. A cylinder 50, mounted between cross beam 29 of main frame 11 and sledge assembly 20, provides a compressive force that resists the force on sledge 20 under conditions where the chamber is expanding. The function of cylinder 50 will be discussed in further detail below.

The bale forming chamber is further defined by an apron 32 comprising a plurality of laterally spaced side-by-side belts supported by guide rolls 33, 34, 35, rotatably mounted in tailgate 14, and roll 36, rotatably mounted on stationary arms 37, affixed to main frame 11. Apron 32 is also supported on a drive roll 38, mounted on main frame 11. Although apron 32 passes between roll 21 and idler roll 31, it is in engagement only with idler roll 31 and not roll 21. In addition to its bale forming function, roll 21 also serves to strip crop material from the belts. Suitable coupling means (not shown) connected to drive shaft 28 provide rotation of drive roll 38 causing movement of apron 32 along its varying paths in the directions indicated by the arrows in FIGS. 1, 2 and 3. An additional guide roll 40 in the main frame 11 ensures proper driving engagement between the surfaces of the belts of apron 32 and the surface of drive roll 38.

A pair of take up arms 41 (only one shown), integral with sledge assembly 20, are affixed to sledge arms 24 for movement between inner, intermediate, outer and bale discharge positions shown in FIGS. 1, 2, 3 and 4, respectively. Take up arms 41, which carry additional guide rolls 43, 44 for supporting apron 32, are urged with sledge assembly 20 toward the innermost position (FIG. 1), i.e., bale starting position, by tension spring 42, mounted between one of arms 41 and main frame 11 by bracket assembly 39, affixed to main frame 11. Spring 42, mounted outwardly from wall 19, is pivotally secured to arm 41 by journal means 53 extending through access slot s in side wall 19. While a basic function of spring 42 is to return the sledge and takeup assemblies to the start position after a bale is discharged, it also provides a force on sledge assembly 20 that resists expansive forces on the elements defining the chamber, under conditions where a cylindrical package of crop material is progressively expanding during formation.

When the elements of round baler 10 are disposed as shown in FIG. 1, an inner course c of apron 32 extends between guide roll 35 and idler roll 31 to form the rear wall of the core starting chamber while the inwardly facing peripheral surfaces of rolls 21, 22, 23 define in a general manner a rearwardly inclined cooperating front wall. Floor roll 18 defines the bottom of the chamber and with starter roller 30 provides an inlet for crop material.

Figure 2:
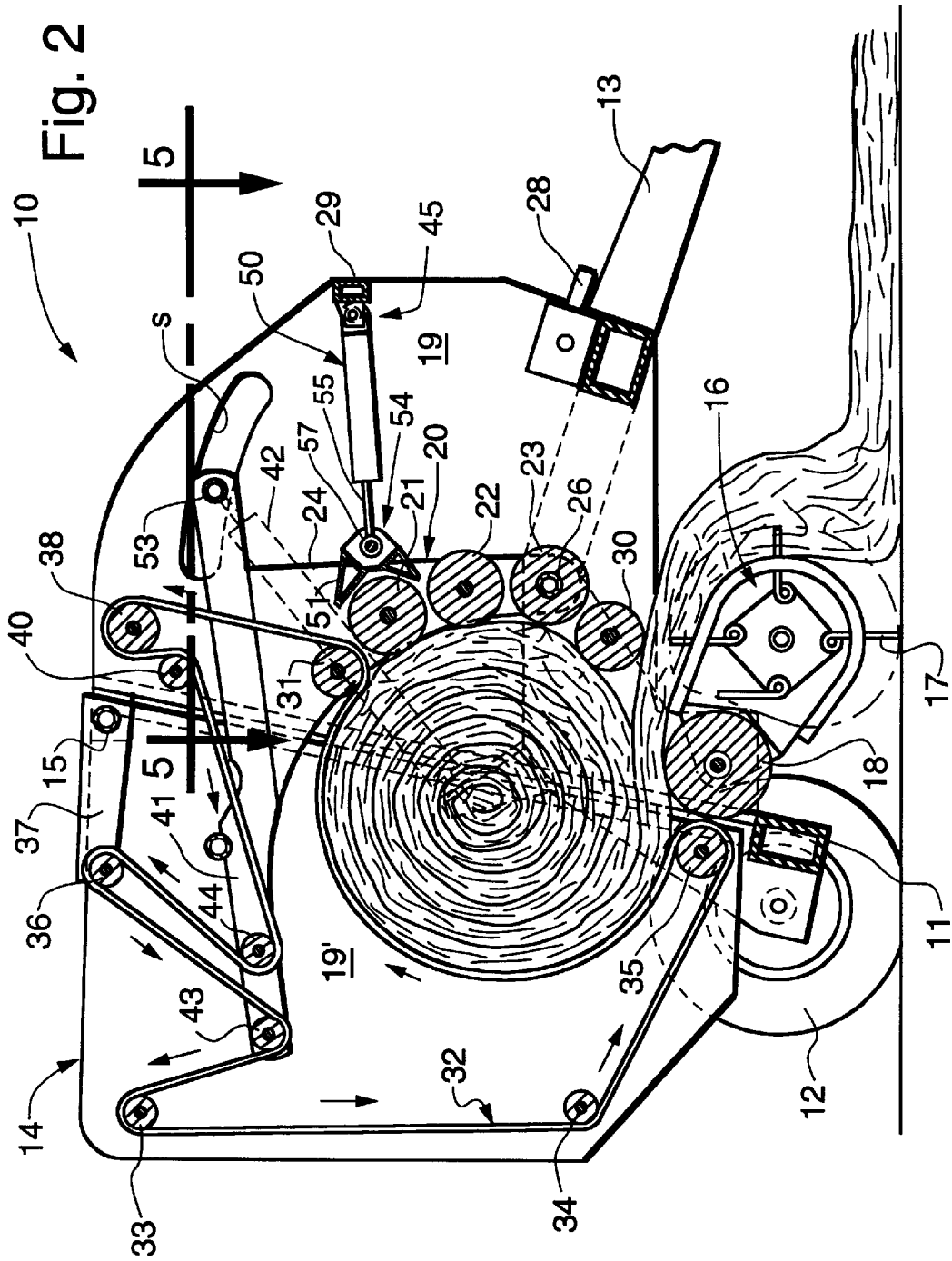
FIG. 2, generally similar to FIG. 1, is a diagrammatic side elevational view of a round baler in which the tailgate is in the closed position and the elements of the bale forming chamber are shown in an intermediate bale forming condition.

When round baler 10 travels across a field, pickup tines 17 lift crop material from the ground and deliver it through the inlet. The crop material is carried rearwardly by floor roll 18 into engagement with apron inner course c (FIG. 1) which urges it upwardly and forwardly into engagement with the rolls on sledge 20. In this manner crop material is coiled in a clockwise direction to start a bale core. Continued feeding by pickup tines 17 of crop material into the bale forming chamber in a generally spiral fashion causes the apron inner course c to expand in length around a portion of the circumference of the cylindrical package of crop material as its diameter increases (FIG. 2). Take up arms 41 rotate with sledge assembly 20 about the coaxial horizontal axes of stub shafts 26 from their initial positions shown in FIG. 1 toward their outer positions shown in FIG. 3 to provide for expansion of the inner course of the apron in a manner similar to that of the prior art balers mentioned above, i.e., in effect the outer course of the belts of apron 32 is diminished in length while the inner course increases a like amount. After a cylindrical package of crop material has been formed in the fashion described and wrapped with twine or net in a well known manner to form a bale, tailgate 14 is opened and the bale is ejected rearwardly as shown in FIG. 4. Subsequent closing of tailgate 14 returns the inner and outer courses of the belts of apron 32 to the locations shown in FIG. 1.

Figure 3:
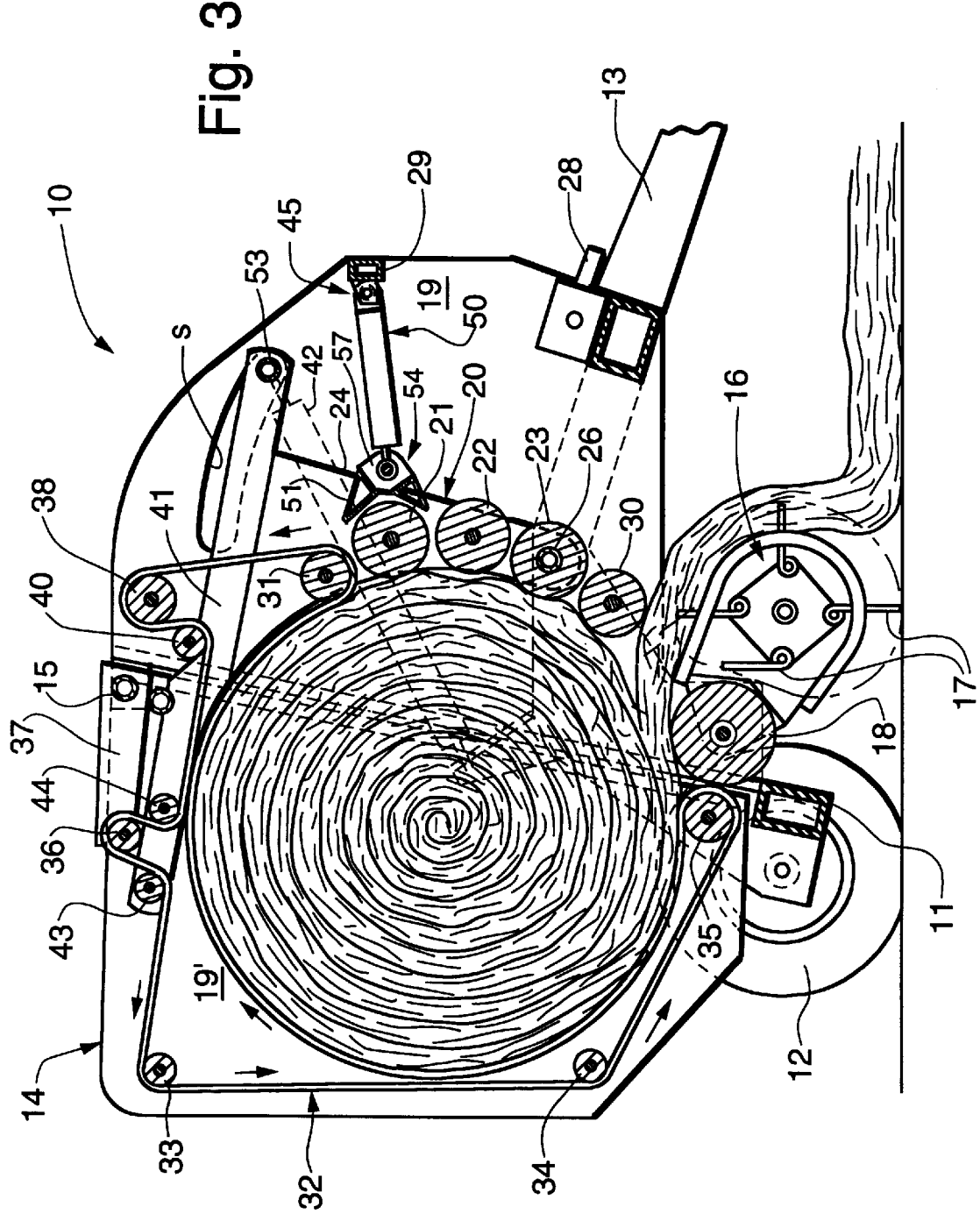
FIG. 3, also generally similar to FIG. 1, is a diagrammatic side elevational view of a round baler in which the tailgate is in the closed position and the elements of the bale forming chamber are shown in the full bale condition.
Figure 4:
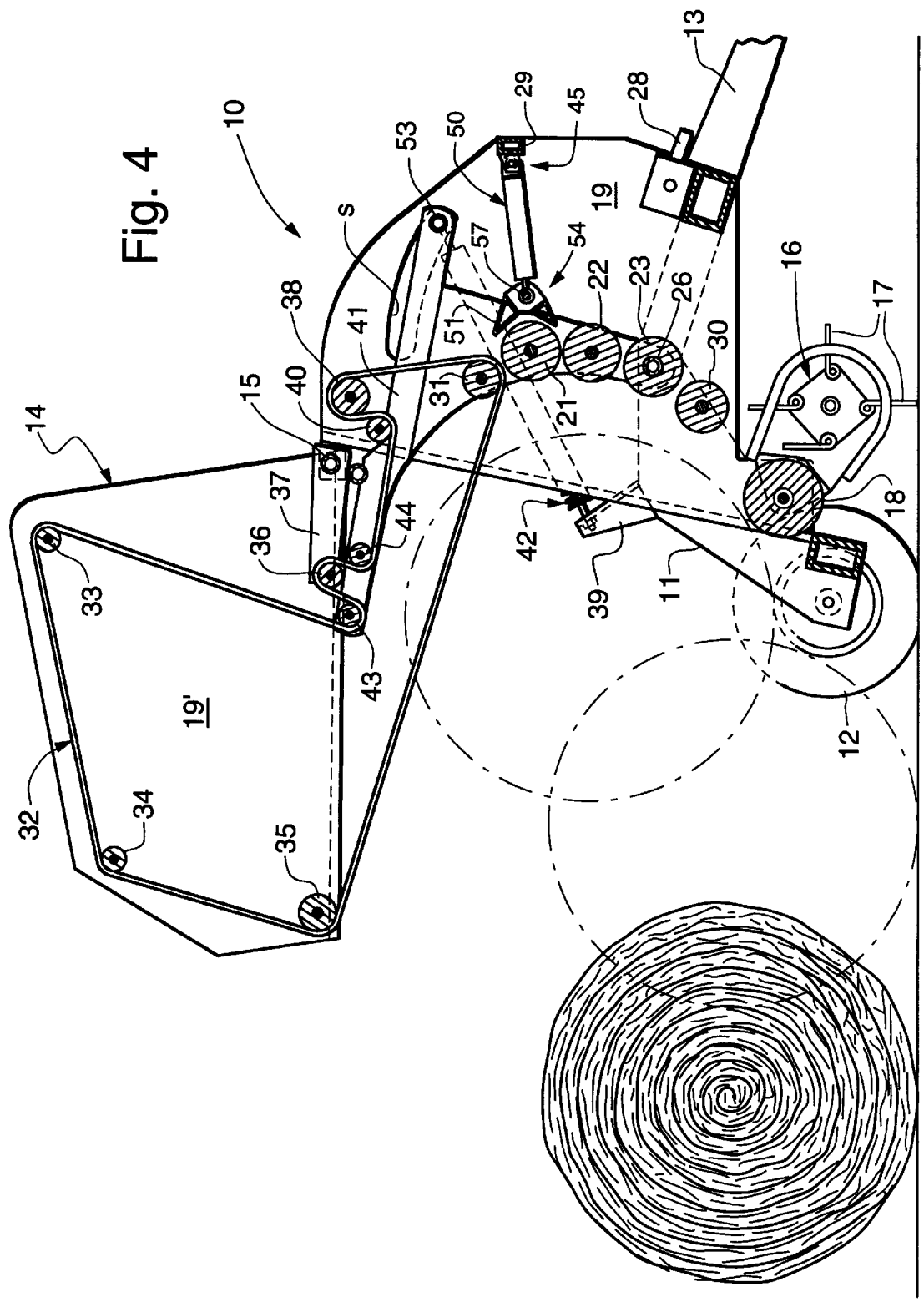
FIG. 4, also a diagrammatic side elevational view of a round baler, shows the tailgate in the open position and the relationship of the elements of the bale forming chamber after a bale has been discharged.

During bale formation, sledge assembly 20, along with the above described integral take up assembly, moves between a bale starting position (FIG. 1) to a full bale position (FIG. 3). This movement of sledge assembly 20 causes idler roll 31 to move along a generally arcuate path while maintaining apron 32 in close proximity to roll 21, thereby allowing roll 21 to strip crop material from the belts and prevent or reduce significantly the loss of crop material through the space between roll 21 and apron 32 during formation of a bale. Sledge assembly 20 is pushed outwardly towards its full bale position during bale formation as the crop material expands against rolls 21, 22, 23 and then subsequently is returned inwardly by apron 32 and spring 42 to the position shown in FIG. 1.

With the above description and general operation of baler 10 as a background, attention will now be directed to important features of the tensioning system to which the present invention is directed. As will become apparent, baler 10 is merely illustrative of one of the many round baler configurations to which such features are adaptable. For example, varying the number of rolls on the sledge assembly or altering the pivot location of the sledge assembly would have no affect on the general aspects of the present invention.

Figure 5:
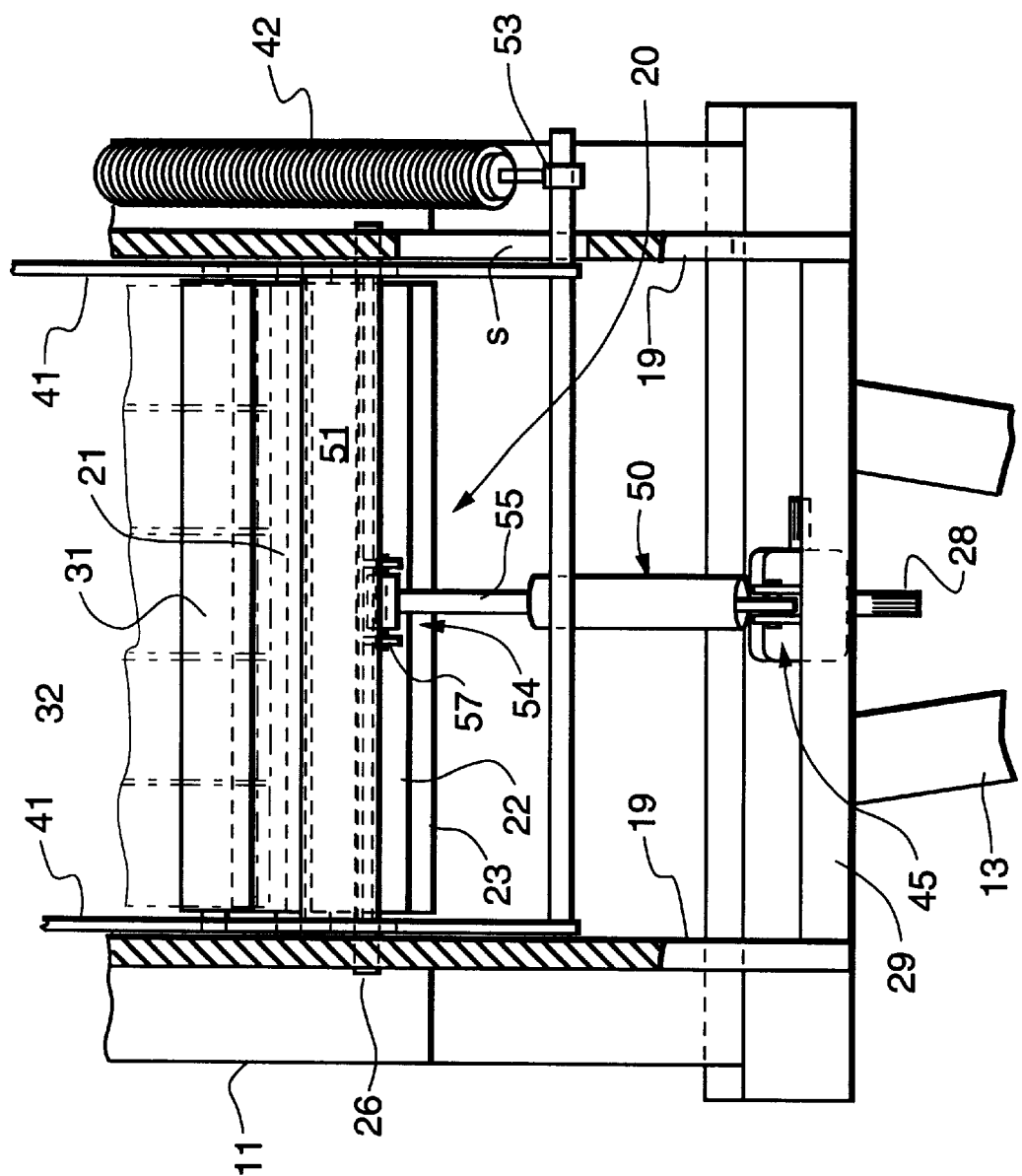
FIG. 5 is a top view taken along lines 5—5 in FIG. 2.
Figure 6:
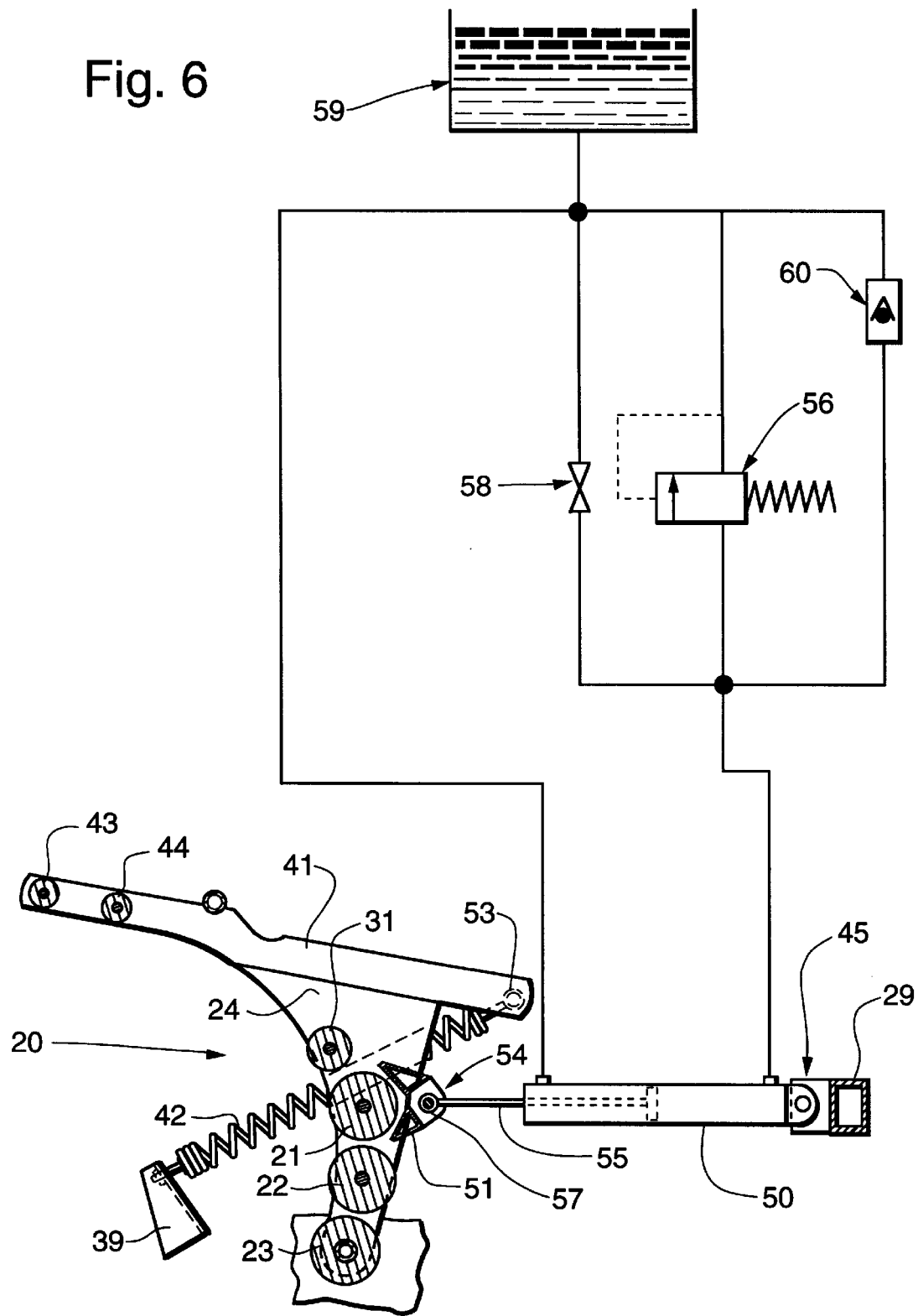
FIG. 6 is a schematic diagram of a hydraulic circuit used in the preferred embodiment of the present invention.

To further enhance understanding of the present invention, attention is directed to the apron tensioning system shown in FIGS. 5 and 6. Hydraulic cylinder 50, generally referred to in the above description of FIGS. 1–4, is mounted in a fore and aft direction between cross beam 29 of main frame 11 and cross element 51 affixed between arms 24 (see FIGS. 1–4) of sledge assembly 20, on which rollers 21, 22 and 23 are rotatably mounted. Cylinder 50 is pivotally mounted on beam 29 by conventional mounting assembly 45. Operative in conjunction with cylinder 50 is conventional tensioning spring 42, referred to above. Spring 42 is pivotally attached via a transverse journal 53 to the forward end of integral takeup arm 41. Spring 42 is attached at its other end to the main frame 19 by bracket assembly 39.

The rod end of hydraulic cylinder 50 is coupled to cross element 51 of sledge assembly 20 in the general transverse center thereof by pivotal mounting means 54 in which the distal end of reciprocal rod 55 is attached via a collar pivotally mounted on a transverse pin extending between a pair of mounting tabs 57. A hydraulic circuit comprising cylinder 50, a pressure relief valve 56 (FIG. 6), on/off ball valve 58, reservoir 59, and one way check valve 60, are operative to maintain a predetermined load on the center of the sledge and takeup assembly during expansion of the chamber during bale formation. Pressure relief valve 56, adjustable in a conventional manner, is set to relieve the pressure in cylinder 50 and permit fluid to flow therethrough when a predetermined force is applied against sledge assembly 20, during expansion of the chamber as a cylindrical package of crop material is being formed. By adjusting the setting of valve 56 the density of the bale being formed can be controlled. One way check valve 60 is operative to replenish fluid to the cylinder when the sledge assembly returns to its initial position causing rod 55 to move outwardly, i.e., from right to left in FIG. 6.

Under conditions where a windrow of crop material is being picked up from the ground and fed into the chamber, resulting in a continuously expanding cylindrical package of crop material, a predetermined compressive force can be maintained on the sledge. This force is centralized by virtue of the location of cylinder 50, and thereby prevents structural twisting of takeup arms 41, which are integral with the sledge assembly. Thus, during operation, the uneven load exerted by crop material expanding against the sledge rolls and the apron belts, the path of which is trained about follower roll 31 mounted on the sledge, is neutralized by centrally located cylinder 50. This obviates various problems, not the least of which is the tenancy for the belts to track in an unsuitable manner when the belt supporting rolls are skewed due to uneven forces. Testing has also determined that this arrangement permits increased bale density over levels heretofore attained.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A round baler for forming crop material into cylindrical bales, said baler having
    a main frame,
    a tailgate pivotally connected to said main frame, said tailgate operative between a closed position during which a bale is being formed, and an open position during which a formed bale is being discharged,
    a sledge assembly mounted on said main frame for movement between a bale starting position and a full bale position, said sledge assembly including conveying means having a crop engaging surface extending transversely of said main frame,
    said sledge assembly conveying means comprising at least two driven rolls, the outer surfaces of which engage said crop material under conditions where said pickup feeds crop material into said chamber, said rolls driven in a direction that urges said crop material along a spiral path in said chamber,
    an apron supported along a continuous path on said main frame and on said tailgate by a plurality of rotatable guide members, said apron path having an inner course that cooperates with said conveying means on said sledge assembly to define a bale forming chamber, said apron comprises a plurality of side-by-side belts, drive means for moving said apron along said continuous path, a spring assembly including resilient means for urging said sledge assembly to said bale starting position, and a pickup for feeding crop material into said chamber, the improvement comprising a hydraulic cylinder, means for mounting said hydraulic cylinder in a centrally located general fore and aft direction between said main frame and said sledge assembly for providing a compressive load on said sledge assembly, under conditions where said sledge is moving between said starting position and said full position, means for coupling said hydraulic cylinder to said sledge assembly, a rigid transverse element affixed to said sledge for movement in concert therewith, and pivotal attachment means located in the general transverse center of said element for securing said cylinder thereto.

2. In a round baler as set forth in claim 1 wherein one of said at least two driven rolls is pivotally mounted on said main frame, and said resilient means is affixed at one end to said sledge assembly and affixed at the other end to said main frame, whereby said resilient means provides a force that urges said sledge assembly to pivot about said at least one of said two driven rolls.

3. In a round baler as set forth in claim 2 wherein said force provided by said resilient means urges said sledge assembly in a direction that reduces said compressive load.

4. In a round baler as set forth in claim 1 wherein said improvement further comprises hydraulic circuit means comprising said cylinder and pressure relief means set to relieve the pressure in said cylinder when a predetermined force is applied against said sledge under conditions where crop material is being fed into said chamber.

5. In a round baler as set forth in claim 4, wherein said pressure relief means comprise a pressure relief valve.

6. In a round baler as set forth in claim 5 wherein said pressure relief valve is adapted to vary said predetermined force.

\* \* \* \* \*